(12) United States Patent
Kidney et al.

(10) Patent No.: US 8,689,040 B2
(45) Date of Patent: Apr. 1, 2014

(54) METHOD AND SYSTEM FOR DATA RECONSTRUCTION AFTER DRIVE FAILURES

(75) Inventors: Kevin Kidney, Lafayette, CO (US); Timothy Snider, Derby, KS (US)

(73) Assignee: LSI Corporation, San Jose, CA (US)

( * ) Notice: Subject to any disclaimer, the term of this patent is extended or adjusted under 35 U.S.C. 154(b) by 545 days.

(21) Appl. No.: 12/896,449

(22) Filed: Oct. 1, 2010

(65) Prior Publication Data

US 2012/0084600 A1 Apr. 5, 2012

(51) Int. Cl.
*G06F 11/00* (2006.01)

(52) U.S. Cl.
USPC .......................... 714/6.1; 714/6.13; 714/6.22

(58) Field of Classification Search
USPC .......................................... 714/6.1, 6.13, 6.22
See application file for complete search history.

(56) References Cited

U.S. PATENT DOCUMENTS

| | | | | |
|---|---|---|---|---|
| 5,243,428 A | * | 9/1993 | Challapali et al. | 348/607 |
| 5,303,244 A | * | 4/1994 | Watson | 714/5.1 |
| 5,592,612 A | * | 1/1997 | Birk | 714/6.24 |
| 5,754,756 A | * | 5/1998 | Watanabe et al. | 714/6.21 |
| 6,018,778 A | * | 1/2000 | Stolowitz | 710/61 |
| 6,151,685 A | * | 11/2000 | Li et al. | 714/6.1 |
| 6,609,145 B1 | * | 8/2003 | Thompson et al. | 718/103 |
| 6,609,176 B1 | * | 8/2003 | Mizuno | 711/114 |
| 6,799,284 B1 | * | 9/2004 | Patel et al. | 714/6.21 |
| 7,587,626 B2 | * | 9/2009 | Terry et al. | 714/6.11 |
| 7,721,143 B2 | * | 5/2010 | Humlicek | 714/6.12 |
| 7,805,633 B2 | * | 9/2010 | Sangapu et al. | 714/6.32 |
| 8,090,980 B2 | * | 1/2012 | Danilak | 714/6.22 |
| 8,135,984 B2 | * | 3/2012 | Perng | 714/6.24 |
| 2002/0066050 A1 | * | 5/2002 | Lerman et al. | 714/6 |
| 2004/0114811 A1 | * | 6/2004 | Lim et al. | 382/232 |
| 2004/0255223 A1 | * | 12/2004 | Chawla | 714/763 |
| 2008/0091741 A1 | * | 4/2008 | Zohar et al. | 707/202 |
| 2009/0138753 A1 | * | 5/2009 | Tameshige et al. | 714/4 |
| 2009/0172769 A1 | * | 7/2009 | Bobak et al. | 726/1 |
| 2009/0177838 A1 | * | 7/2009 | Haustein et al. | 711/114 |
| 2009/0271659 A1 | * | 10/2009 | Troppens et al. | 714/7 |
| 2010/0030960 A1 | * | 2/2010 | Kamalavannan et al. | 711/114 |
| 2010/0122115 A1 | | 5/2010 | Olster | |
| 2011/0225453 A1 | * | 9/2011 | Spry et al. | 714/15 |
| 2012/0079189 A1 | * | 3/2012 | Colgrove et al. | 711/114 |
| 2012/0079317 A1 | * | 3/2012 | Nelogal et al. | 714/6.22 |

FOREIGN PATENT DOCUMENTS

GB 2418039 A 3/2006

\* cited by examiner

*Primary Examiner* — Loan L. T. Truong
(74) *Attorney, Agent, or Firm* — Suiter Swantz pc llo

(57) ABSTRACT

Methods and systems for data reconstruction following drive failures may include: storing data across two or more drives in one or more data stripes, each data stripe including two or more drive extents; detecting a degradation of a drive containing a drive extent associated with a first data stripe; assigning a reconstruction priority to the drive extent associated with the first data stripe; detecting a degradation of a drive containing a drive extent associated with a second data stripe; and assigning a reconstruction priority to the drive extent associated with the second data stripe.

18 Claims, 15 Drawing Sheets

METHOD AND SYSTEM FOR DATA RECONSTRUCTION AFTER DRIVE FAILURES

SUMMARY OF INVENTION

Methods and systems for data reconstruction following drive failures may include: storing data across two or more drives in one or more data stripes, each data stripe including two or more drive extents; detecting a degradation of a drive containing a drive extent associated with a first data stripe; assigning a reconstruction priority to the drive extent associated with the first data stripe; detecting a degradation of a drive containing a drive extent associated with a second data stripe; and assigning a reconstruction priority to the drive extent associated with the second data stripe.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Referring generally to FIGS. 1-15, the present disclosure is directed to systems and methods for monitoring and controlling data reconstruction operations following drive failures in a storage subsystem where volume data is distributed across the drives. Drive data may be tracked and rebuilt based on priorities assigned to various data partitions. For example, data stripes (e.g. portions of contiguous data distributed across multiple drives) that have experienced multiple failures or contain data having a particular reconstruction priority designation may be reconstructed first in order to avoid data loss. After these critical stripes have been reconstructed, normal degraded stripes in the subsystem may be reconstructed.

Reference will now be made in detail to the subject matter disclosed, which is illustrated in the accompanying drawings.

Figure 1:
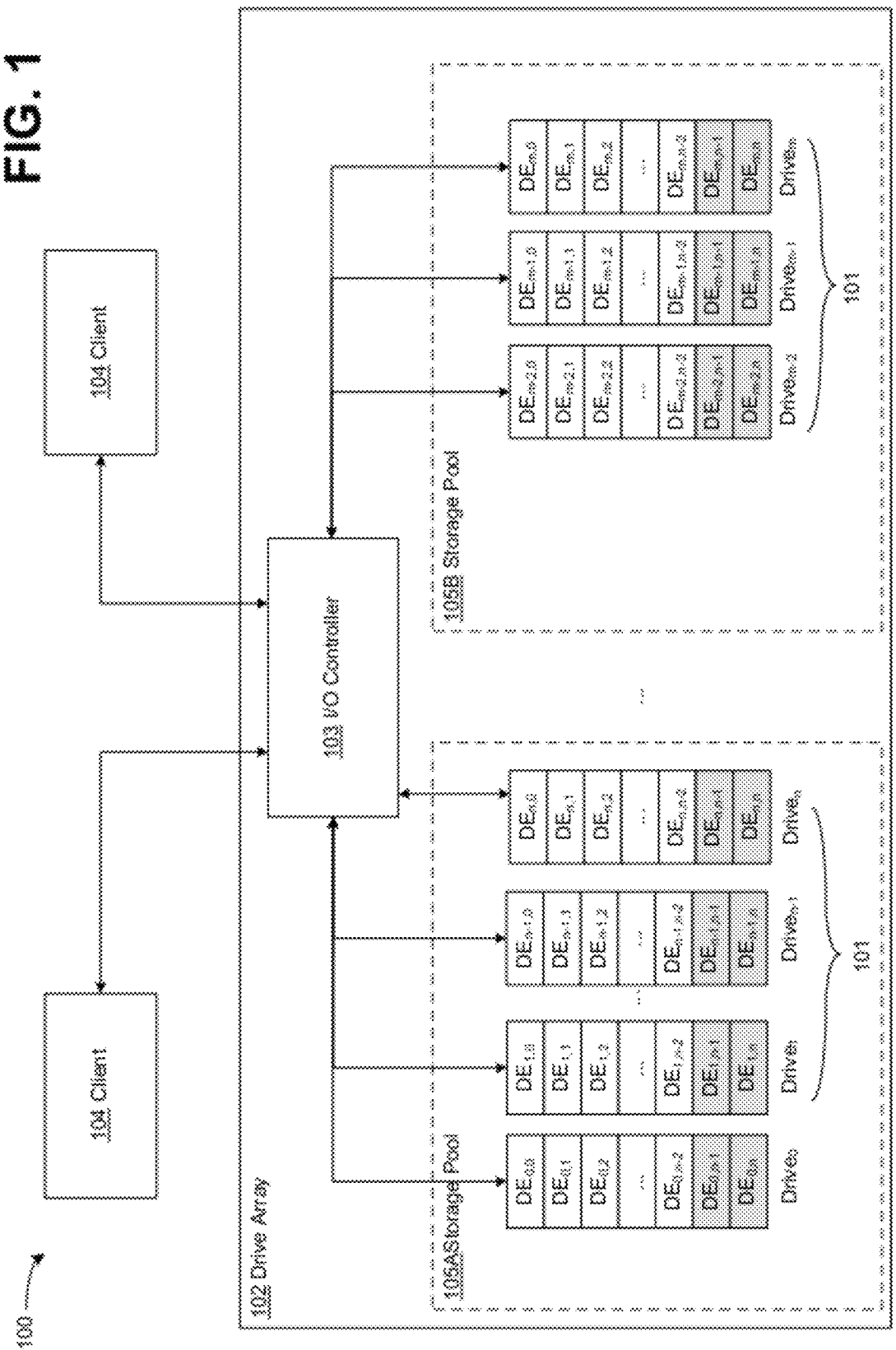
FIG. 1 illustrates a system for degraded drive reconstruction.

As shown in FIG. 1, a distributed data storage system 100 is shown. For example, the system 100 may define a distribution of data across various drives 101 available in an m-drive array 102. A data distribution algorithm may serve to uniformly distribute data across a pool of storage in a pseudo-random, but repeatable, fashion. The distribution algorithm may be deterministic, which enables independent client nodes to each implement the same model and reach the same data distribution on a shared pool of storage. This allows data to be written or read by any node in a system and every node will locate the same data in the same place. The data allocation may be controlled by an I/O controller 103. The I/O controller 103 may receive data input/output commands from at least one client device 104 and execute those commands to store or retrieve data according to the algorithm. Exemplary data distribution algorithms may include, but are not limited to, the Controlled Replication Under Scalable Hashing system (e.g. such as those developed by the University of California at Santa Cruz as part of the Storage System Research Center), NextGenDPL, dynaStor, and other dynamic storage layouts.

The drives 101 may be grouped into sets based on similar attributes. Each set of drives having common attributes may define a storage pool 105 (e.g. $Drive_0$, $Drive_1$, $Drive_{n-1}$ and $Drive_n$ defining storage pool 105A and $Drive_{m-2}$, $Drive_{m-1}$ and $Drive_m$ defining storage pool 105B). For example, if all of the drives 101 in a system fall into the same QoS group, only one storage pool 105 may be created. While the drives 101 may be grouped according to QoS, it is fully contemplated that the drives 101 may be grouped into pools by any number of other drive characteristics (e.g. drive size, manufacturer, performance, and the like).

Figure 2:
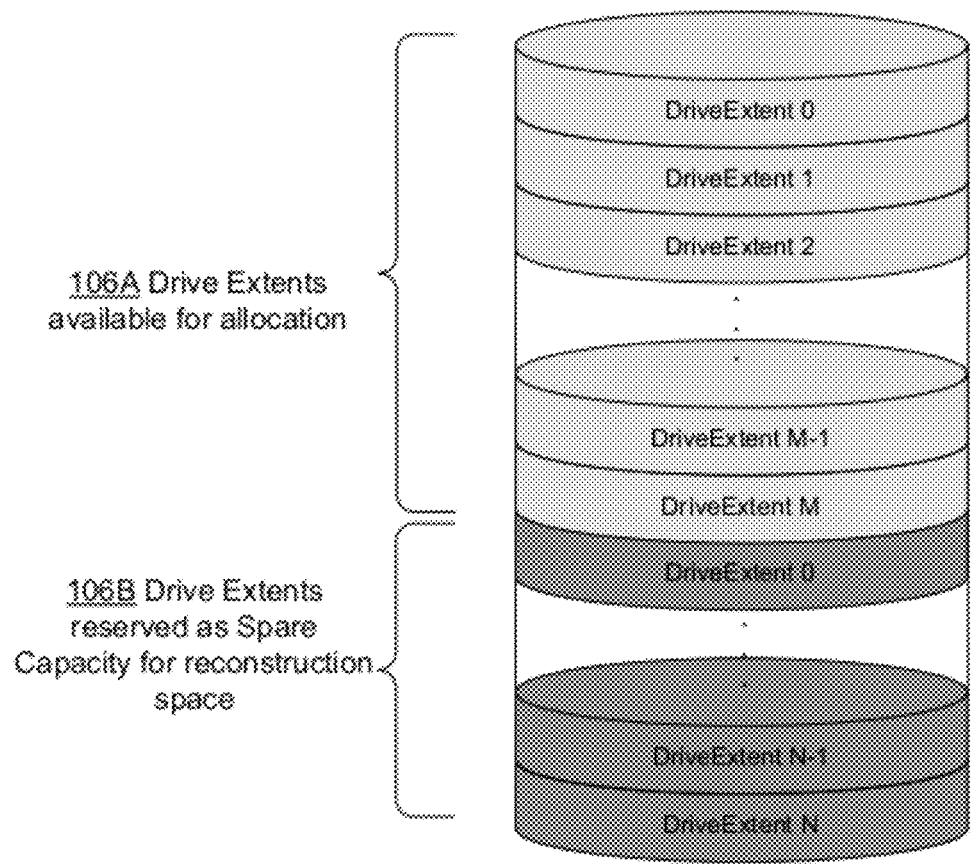
FIG. 2 illustrates a system for degraded drive reconstruction.

As shown in FIG. 2, a Drive Extent (DE) 106 may be a unit of allocation of drive space on a drive 101. The useable capacity of each drive may be divided up into such drive extents 106 (e.g. m drive extents 106A). The size of the drive extents 106 may be dependent on the number of drives, drive capacity, number of storage pools 105, and internal firmware and other implementation-dependent requirements. In the system 100, drive extents 106 (e.g. n drive extents 106B) may be reserved on each drive 101 for reconstruction operations. It should be noted that reconstruction drive extents 106B need not be contiguous or located at the end of a drive 101 but may be distributed across any portion of the drive 101.

Figure 3:
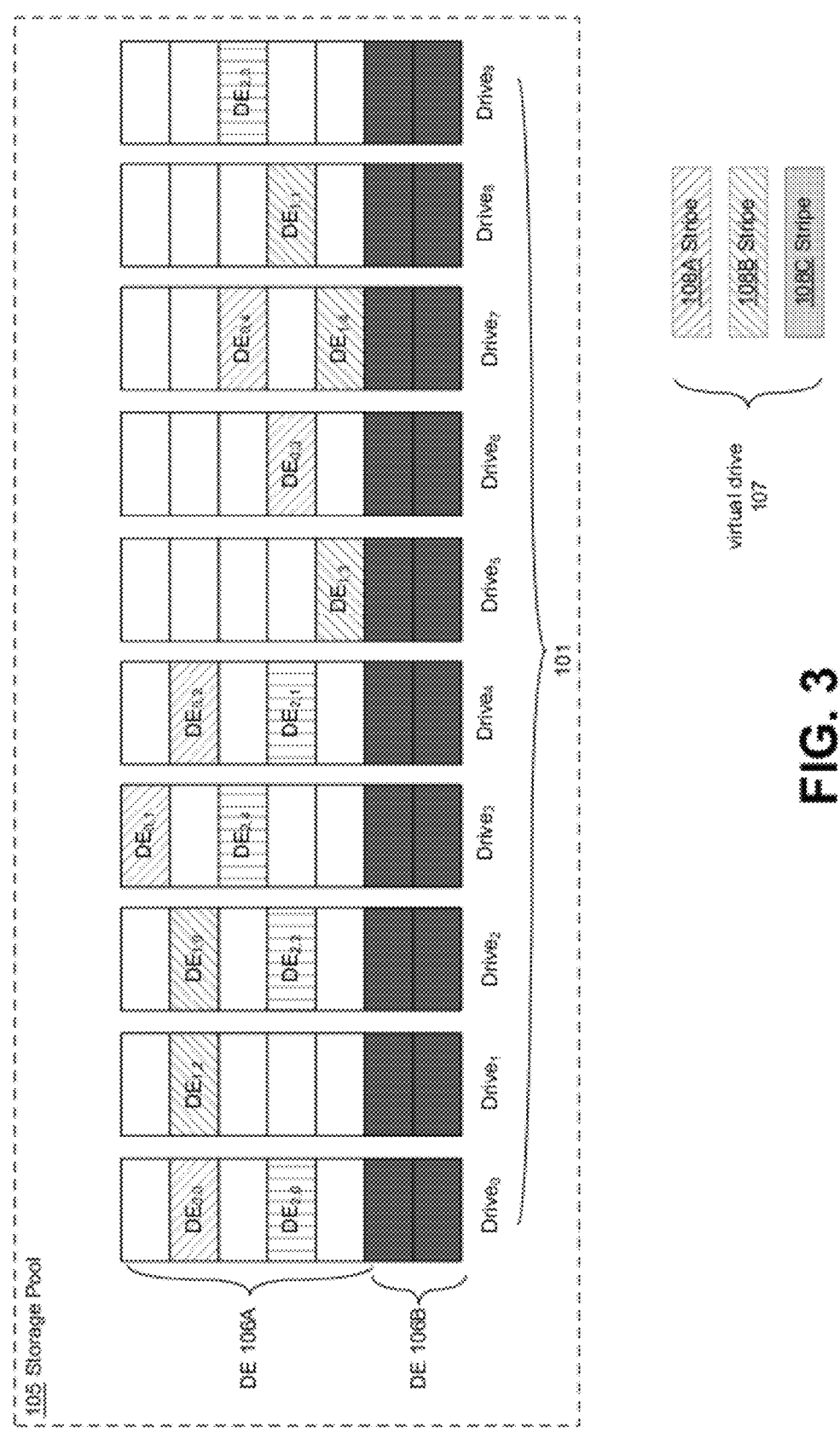
FIG. 3 illustrates a system for degraded drive reconstruction.

Each storage pool 105 may be used to implement one or more virtual drives 107, such as shown in FIG. 3. A virtual drive 107 may span only a portion of a storage pool 105. A client device 104 may define one or more virtual drives that may be contained in a storage pool 105. Virtual drive data may be spread across an entire storage pool 105 using a data distribution algorithm. A virtual drive 107 may be created by building and concatenating stripes (as described below) until the desired capacity has been obtained. The maximum single virtual drive 107 capacity may be limited only by the free capacity of the storage pool 105 in which the virtual drive 107 resides. Every virtual drive 107 may be created as a RAID6 volume, with a fixed segment size and a fixed stripe width.

Each drive 101 may include an associated drive extent map that tracks the allocation of drive extents 106. As virtual drives 107 are created, the drive extents 106 that are allocated to a particular virtual drive 107 may be no longer available for allocation. A map may be maintained so that additional allocations from the drive only allocate free drive extents 106.

Referring to FIG. 3, a stripe 108 may be defined as a data set distributed across a given set of drives 101 that makes up one subsection of a virtual drive 107. A stripe 108 may contain one or more drive extents 106 that may be associated with data and parity for the virtual drive 107.

FIG. 3 further shows the relationship between drive extents 106, stripes 108, and virtual drives 107. For example, as shown in FIG. 3, a virtual drive 107 may include three stripes 108 (e.g. stripe 108A, stripe 108B, and stripe 108C). Each stripe 108 may include five drive extents 106 (e.g. $DE_{0,0}$ through $DE_{0,4}$, $DE_{1,0}$ through $DE_{1,4}$ and $DE_{2,0}$ through $DE_{2,4}$, respectively) distributed across the drives 101. A stripe 108 may contain one or more drive extents 106 that may be associated with data and parity for the virtual drive 107.

It may be desirable to provide monitoring and reconstruction services for a virtual drive 107 in the event that one or more drives 101 including portions of one or more stripes 108 of that virtual drive 107 becomes degraded (e.g. unavailable for storage and/or retrieval of user data due to electronic or mechanical failures such as drive hardware errors, drive reported I/O failures, failures remaining following all error recovery algorithms and ECC correction methods have been applied excessive read-write errors, system delays, and the like). All virtual drives 107 may be configured as RAID6 such that they are able to withstand up to two drive failures within any Cstripe. Because each stripe 108 may include a pseudo-random set of drives, any one failure of a drive 101 may or may not affect a particular stripe 108. The more drives 101 that there may be in a storage pool 105, the less likely a drive failure will affect any one stripe 108.

Figure 4:
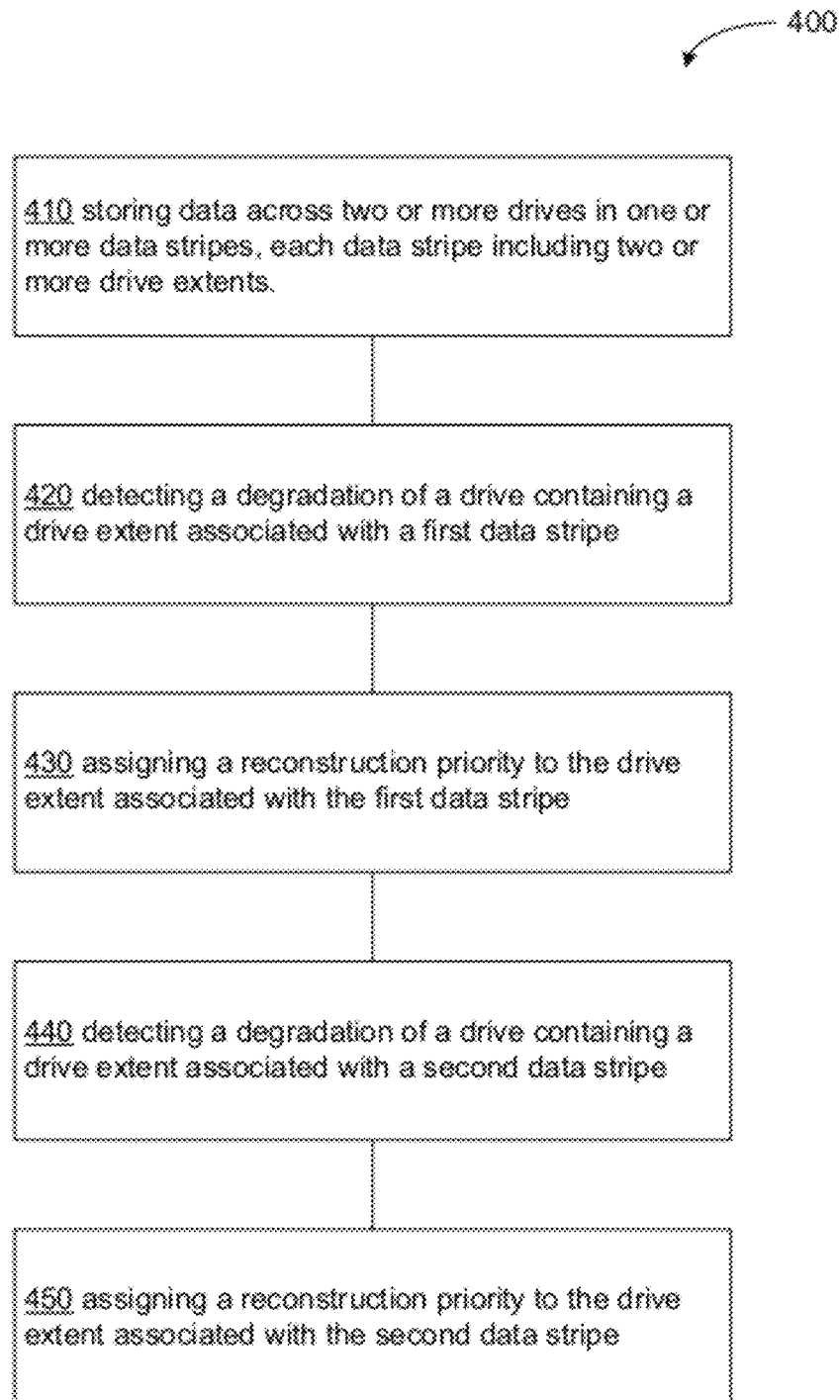
FIG. 4 illustrates a method for degraded drive reconstruction.

FIG. 4 illustrates an operational flow 400 representing example operations related to reconstructing of a degraded virtual drive 107. In FIG. 4 and in following figures that include various examples of operational flows, discussion and explanation may be provided with respect to the above-described examples of FIG. 4, and/or with respect to other examples and contexts. However, it should be understood that the operational flows may be executed in a number of other environments and contexts, and/or in modified versions of FIG. 4. Also, although the various operational flows are presented in the sequence(s) illustrated, it should be understood that the various operations may be performed in other orders than those that are illustrated, or may be performed concurrently.

Operational flow 400 may include one or more operations. For example, Operational flow 400 may include an operation 410, and/or an operation 420, and/or an operation 430, and/or an operation 440 and/or an operation 450.

Operation 410 depicts storing data across two or more drives in one or more data stripes, each data stripe including two or more drive extents. For example, as shown in FIGS. 1-3, the I/O controller 103 may receive data input/output commands from at least one client device 104 and execute those commands to store or retrieve data according to a data distribution algorithm (e.g. a simple serial data storage algorithm, a CRUSH storage algorithm, and the like). The data may be distributed in a striped manner across various drives 101 (e.g. stripes 108) as shown in FIG. 3.

Figure 7:
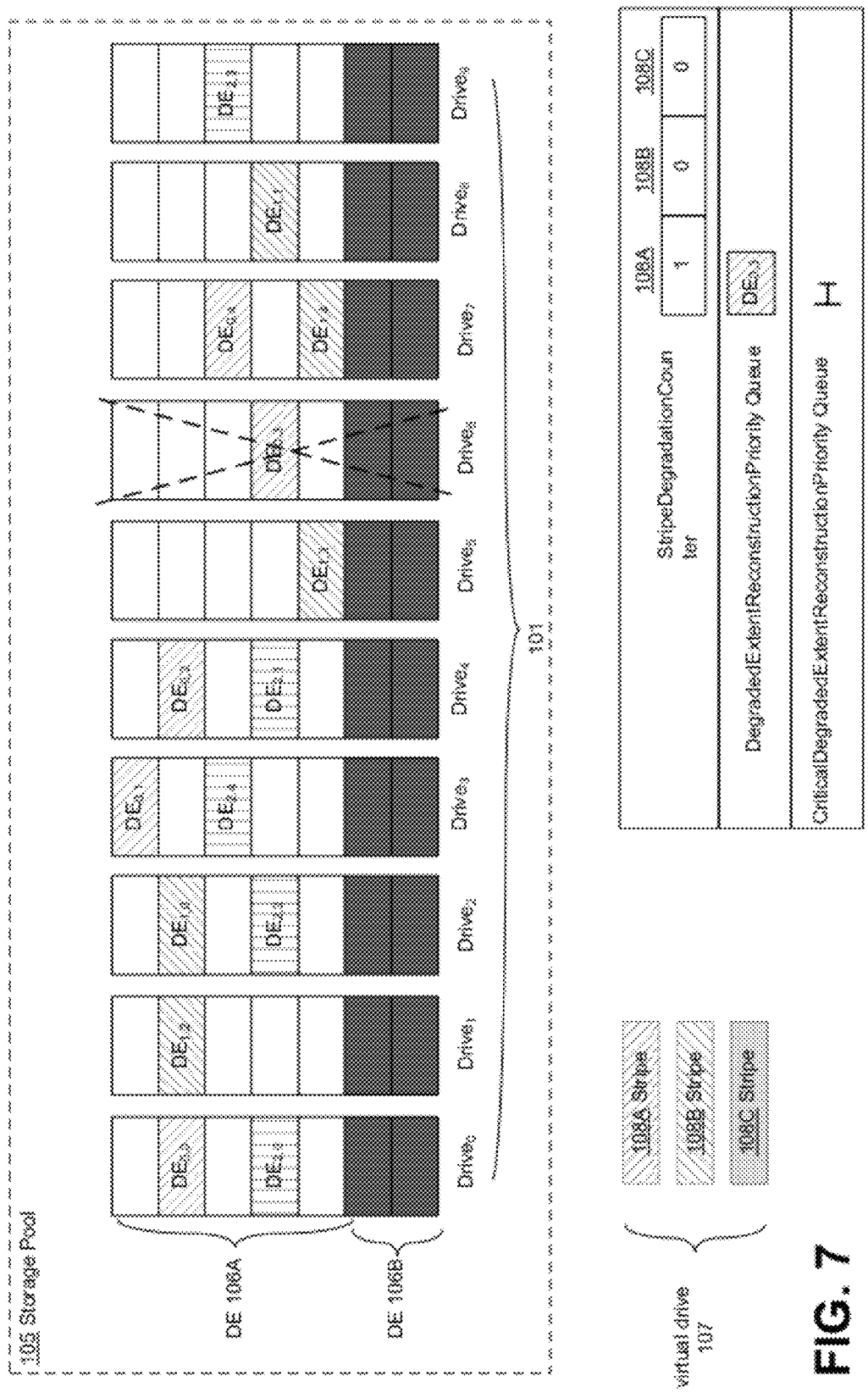
FIG. 7 illustrates a system for degraded drive reconstruction.

Operation 420 depicts detecting a degradation of a drive containing a drive extent associated with a first data stripe. For example, as shown in FIG. 7, it may be the case that one of the drives 101 (e.g. $Drive_6$) containing a drive extent 106 (e.g. $DE_{0,3}$) associated with a first stripe 108 (e.g. stripe 108A) may suffer a drive degradation. When a drive 101 in a storage pool 105 fails, drive extents 106A residing on the failed drive 101 may be reconstructed to reconstruction drive extents 106B of remaining operational drives 101 in the storage pool 105. The data reconstructed to the drive extents 106B may then be copied to a replacement drive 101 substituted for the failed drive 101. The I/O controller 103 may monitor the health of each drive 101 to detect drive degradations which exceed tolerance levels.

Upon a detection of a degraded drive 101 (e.g. $Drive_6$), the controller may transition stripes 108 (e.g. stripe 108A) having drive extents 106 (e.g. $DE_{0,3}$) to a degraded state. For example, the I/O controller 103 may maintain a counter associated with each stripe 108 (e.g. DegradedDriveCounter). The counter may track the severity of the degradation of a stripe 108 according to the following values: 0—Not degraded; 1—Degraded; and 2—Critically Degraded. Degradation values for a given stripe 108 may be increased as drives 101 having drive extents 106A within that stripe 108 become degraded and may be decreased as drives 101 having drive extents 106A within that stripe 108 are reconstructed to replacement drives. For example, as shown in FIG. 7, when a drive 101 (e.g. $Drive_6$) having a drive extent 106A (e.g. $DE_{0,3}$) within a first stripe 108 (e.g. stripe 108A) fails, the DegradedDriveCounter for that stripe 108 may be incremented to "1" to indicated a degraded drive associated with that stripe 108.

Operation 430 depicts assigning a reconstruction priority to the drive extent associated with the first data stripe. Within a virtual drive 107, the reconstruction priority drive extents 106A associated with each stripe 108 may be monitored by the I/O controller 103. Reconstruction priority of a drive extent 106 associated with stripe 108 may be tracked by severity using two queues, one for each degradation severity. A DegradedExtentReconstructionPriority queue may contain all stripes 108 for a virtual drive 107 where only a single drive 101 having a drive extent 106 within the stripe 108 has failed. A CritalDegradedExtentReconstructionPriority queue may contain all stripes 108 for a virtual drive 107 where two drives 101 having drive extents 106 within the stripe 108 have failed.

For example, as shown in FIG. 7, when a drive 101 (e.g. $Drive_6$) having a drive extent 106A (e.g. $DE_{0,3}$) within a first stripe 108 (e.g. stripe 108A) fails, the first drive extent 106A (e.g. $DE_{0,3}$) may be added to the DegradedExtentReconstructionPriority queue. As the stripe 108A is the first identified degraded stripe, it may be assigned to the first position in the DegradedExtentReconstructionPriority queue.

Figure 8:
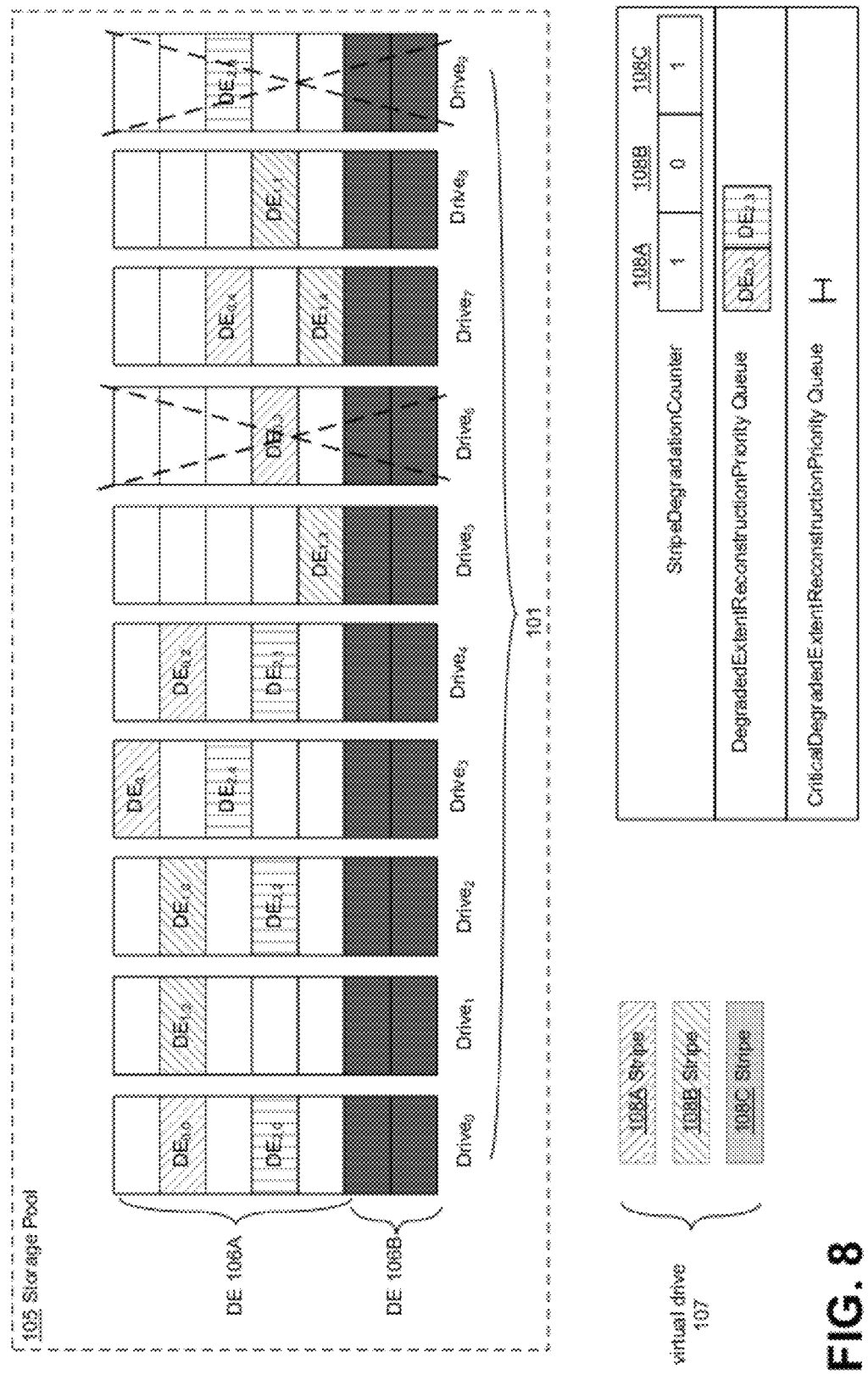
FIG. 8 illustrates a system for degraded drive reconstruction.

Operation 440 depicts detecting a degradation of a drive containing a drive extent associated with a second data stripe. For example, as shown in FIG. 8, a stripe 108C may include a drive extent 106 $DE_{2,3}$ on a drive 101 $Drive_9$. It may be the case that $Drive_9$ suffers a drive failure. The I/O controller 103 the controller may transition stripe 108C having drive extents 106A (e.g. $DE_{2,3}$) within the failed drive 101 $Drive_9$ to a degraded state. For example, the DegradedDriveCounter for stripe 108C may be incremented to "1" (e.g. "Degraded State").

Operation 450 depicts assigning a reconstruction priority to the drive extent associated with the second data stripe. For example, as shown in FIG. 8, when a drive 101 (e.g. $Drive_9$) having a drive extent 106A (e.g. $DE_{2,3}$) within a second stripe 108 (e.g. stripe 108C) fails, the drive extent 106A (e.g. $DE_{2,3}$) may be added to the DegradedExtentReconstructionPriority queue. As the stripe 108C is the second identified degraded stripe, it may be assigned to the second position in the DegradedExtentReconstructionPriority queue. Other priority assignment schemes other than temporal (e.g. first-in-first-out) are contemplated herein. For example, certain data stored in a virtual drive 107 may require enhanced priority in reconstruction (e.g. frequently accessed data, high value data, user-defined priorities, and the like). When such data is contained on a failed drive extent 106A, that data may be given reconstruction priority (e.g. be assigned a higher priority in the DegradedExtentReconstructionPriority queue) so as to ensure the prompt reconstruction of that data to minimize the possibility of data loss.

Figure 5:
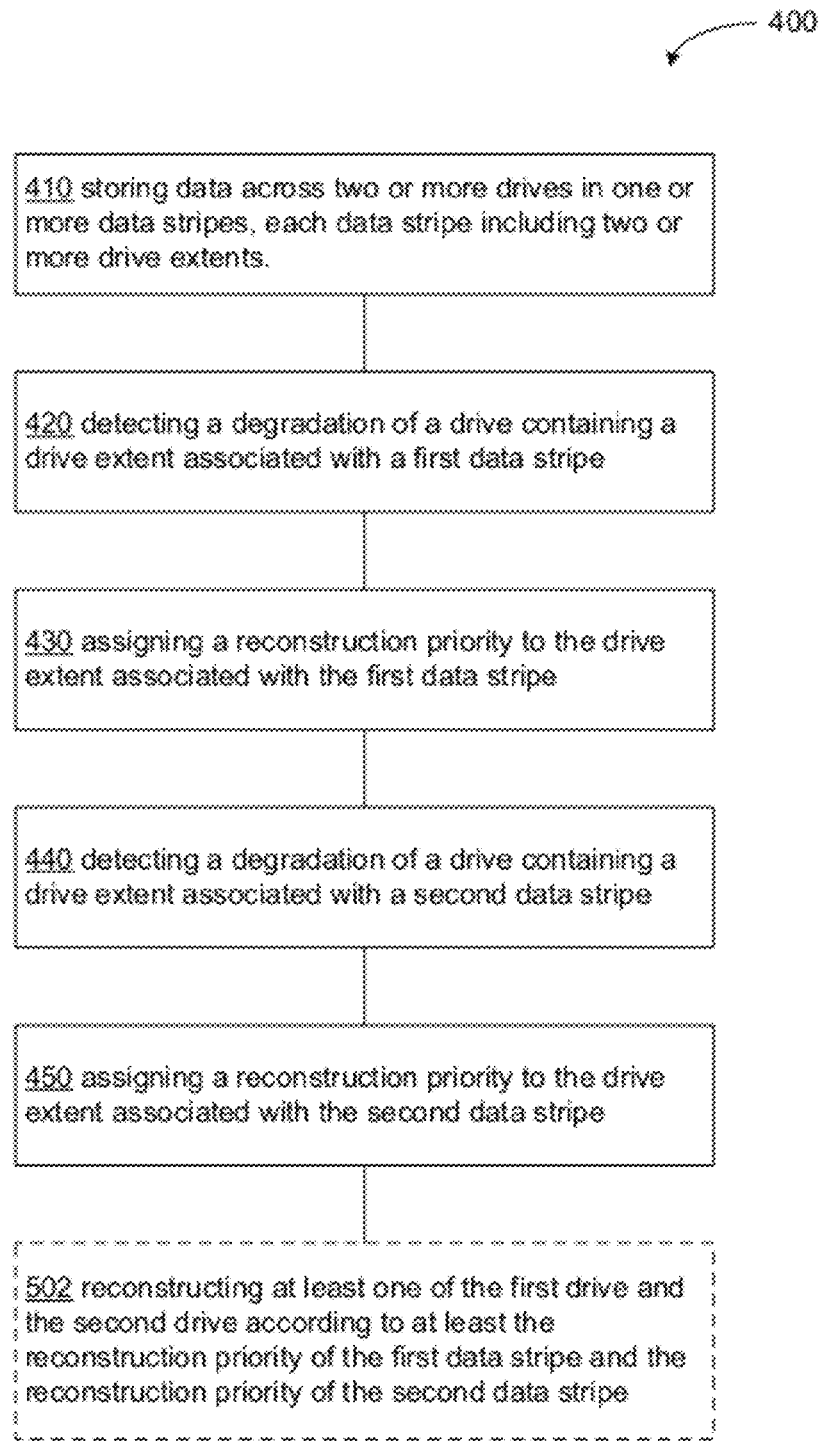
FIG. 5 illustrates a method for degraded drive reconstruction.

FIG. 5 illustrates alternative embodiments of the example operational flow 400 of FIG. 4. FIG. 5 illustrates example embodiments where operational flow 500 may include at least one additional operation. Additional operations may include an operation 502.

Operation 502 depicts reconstructing at least one of the first drive and the second drive according to at least the reconstruction priority of the first data stripe and the reconstruction priority of the second data stripe. For example, referring to FIG. 8, it may be the case the drive extent 106A $DE_{0,3}$ has been designated as having a higher reconstruction priority than drive extent 106A $DE_{2,3}$ (as described above). As such, drive extent 106A $DE_{0,3}$ may be reconstructed to the reconstruction drive extents 106B and copied to a replacement drive prior to the reconstruction of drive extent 106A $DE_{2,3}$. Following reconstruction of drive extent 106A $DE_{0,3}$, drive extent 106A $DE_{0,3}$ may be removed from the DegradedExtentReconstructionPriority queue and reconstruction of $DE_{2,3}$ may commence.

Figure 6:
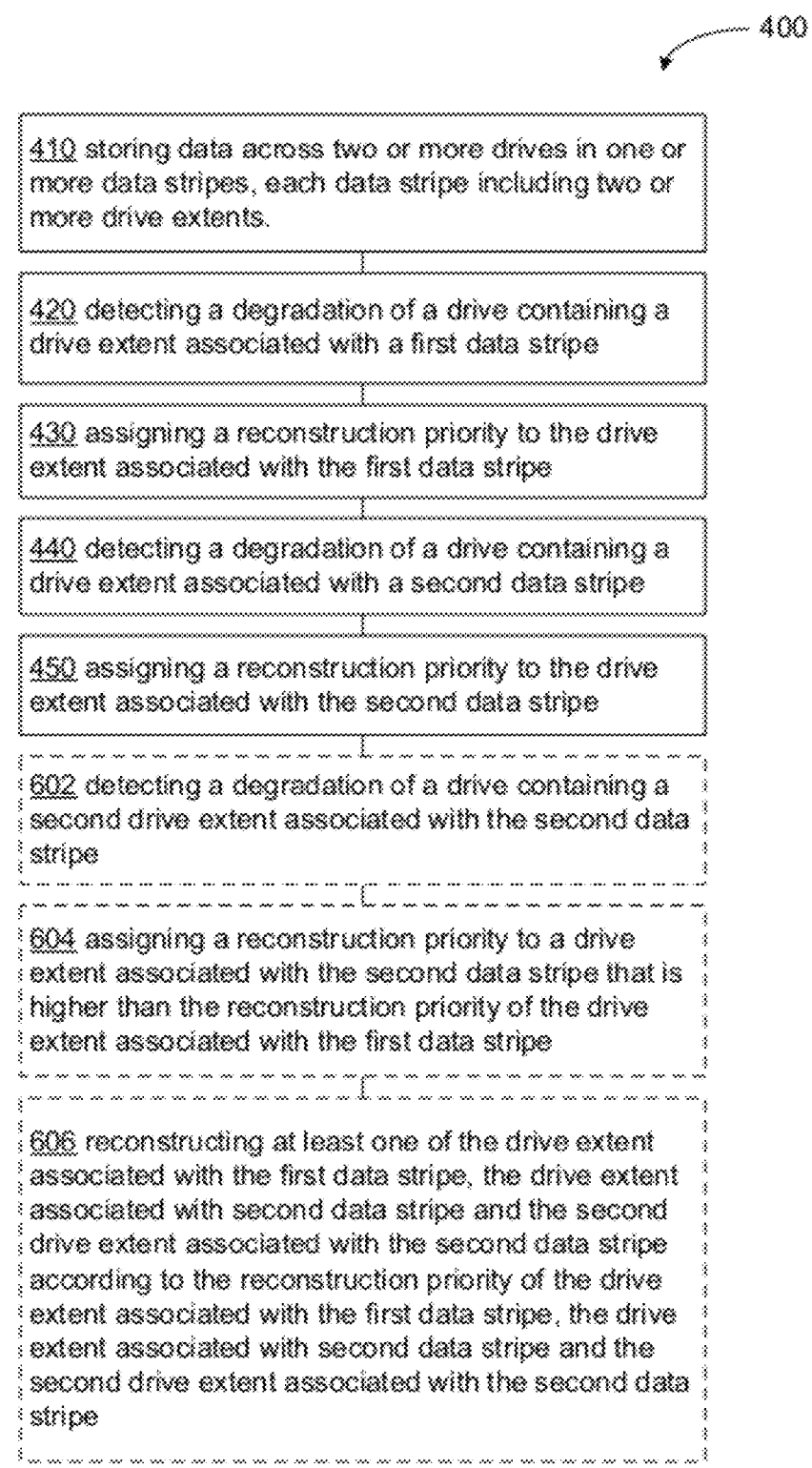
FIG. 6 illustrates a method for degraded drive reconstruction.

FIG. 6 illustrates alternative embodiments of the example operational flow 400 of FIG. 4. FIG. 6 illustrates example embodiments where operational flow 600 may include at least one additional operation. Additional operations may include an operation 602, and/or an operation 604; and/or an operation 606.

Figure 9:
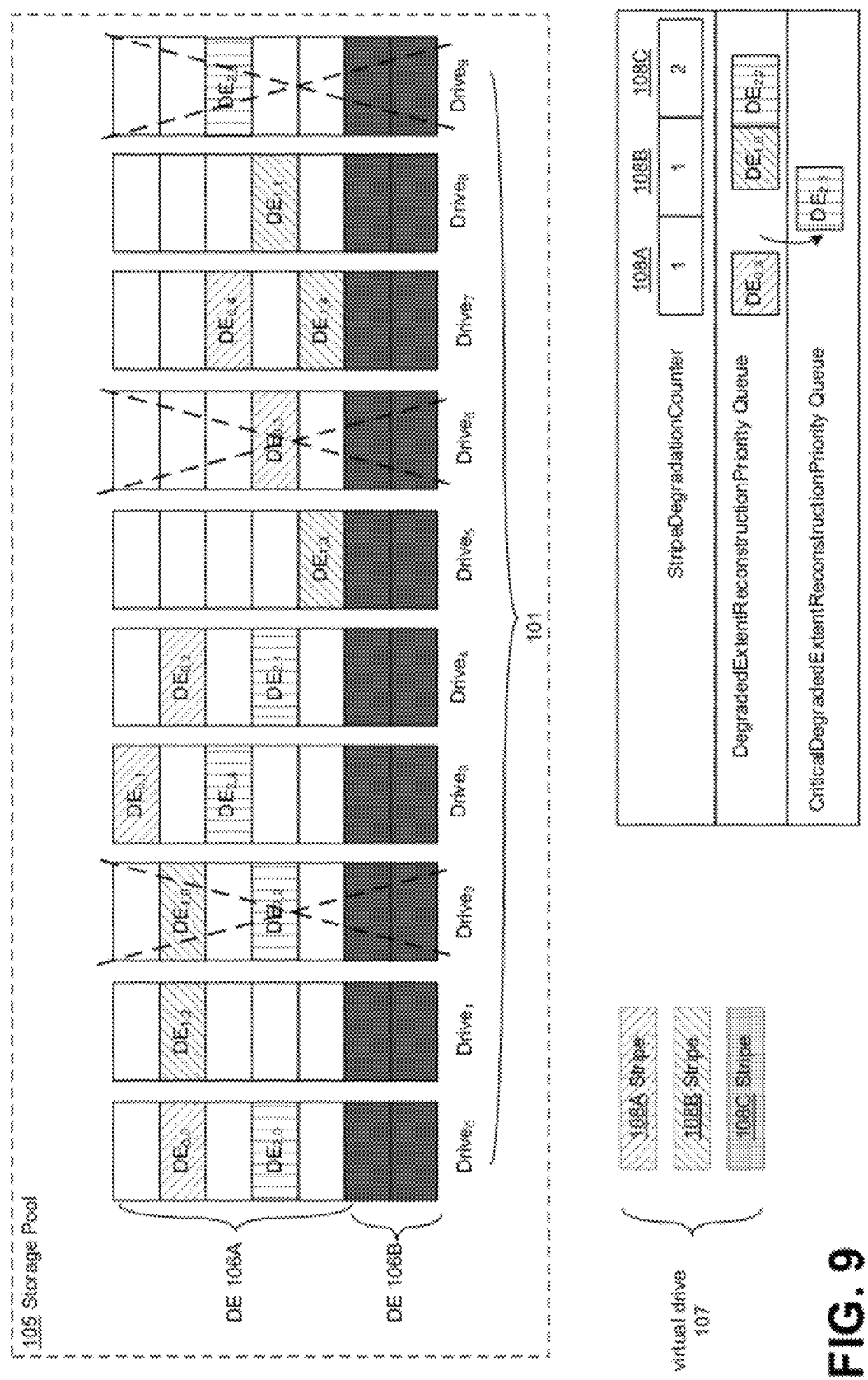
FIG. 9 illustrates a system for degraded drive reconstruction.

Operation 602 depicts detecting a degradation of a drive containing a second drive extent associated with the second data stripe. For example, as shown in FIG. 9, the stripe 108C may include a drive extent 106A $DE_{2,2}$ on a drive 101 $Drive_2$. It may be the case that $Drive_2$ suffers a drive failure. If the stripe 108C already has an existing failed drive extent 106A (e.g. as described above with respect to $DE_{2,3}$ of $Drive_9$), the I/O controller 103 may transition a stripe 108C having a second drive extent 106A (e.g. $DE_{2,2}$) to a critically degraded state. For example, the DegradedDriveCounter for stripe 108C may be incremented to "2" (e.g. "Critically Degraded").

Operation 604 depicts assigning a reconstruction priority to a drive extent associated with the second data stripe that is higher than the reconstruction priority of the drive extent associated with the first data stripe. In the case of a RAID6 configuration, stripes 108 having drive extents 106 on two failed drives 101 have no redundancy protection. As such, as shown in FIG. 9, when a drive 101 (e.g. $Drive_2$) having a drive extent 106A (e.g. $DE_{2,2}$) associated with a stripe 108 (e.g. stripe 108C) fails, if the stripe 108 already has an existing degraded drive extent 106A (e.g. $DE_{2,3}$), the existing degraded drive extent 106A (e.g. $DE_{2,3}$) may be moved to the CriticalDegradedExtentReconstructionPriority Queue and the newly degraded drive extent 106A (e.g. $DE_{2,2}$) may be added to the DegradedExtentReconstructionPriority.

Additionally, as shown in FIG. 9, as $Drive_2$ also includes a drive extent 106A (e.g. $DE_{1,0}$) associated with stripe 108B, the DegradedDriveCounter for stripe 108C may be incremented to "1" and the degraded drive extent 106A $DE_{1,0}$ may be added to the DegradedExtentReconstructionPriority queue.

Figure 10:
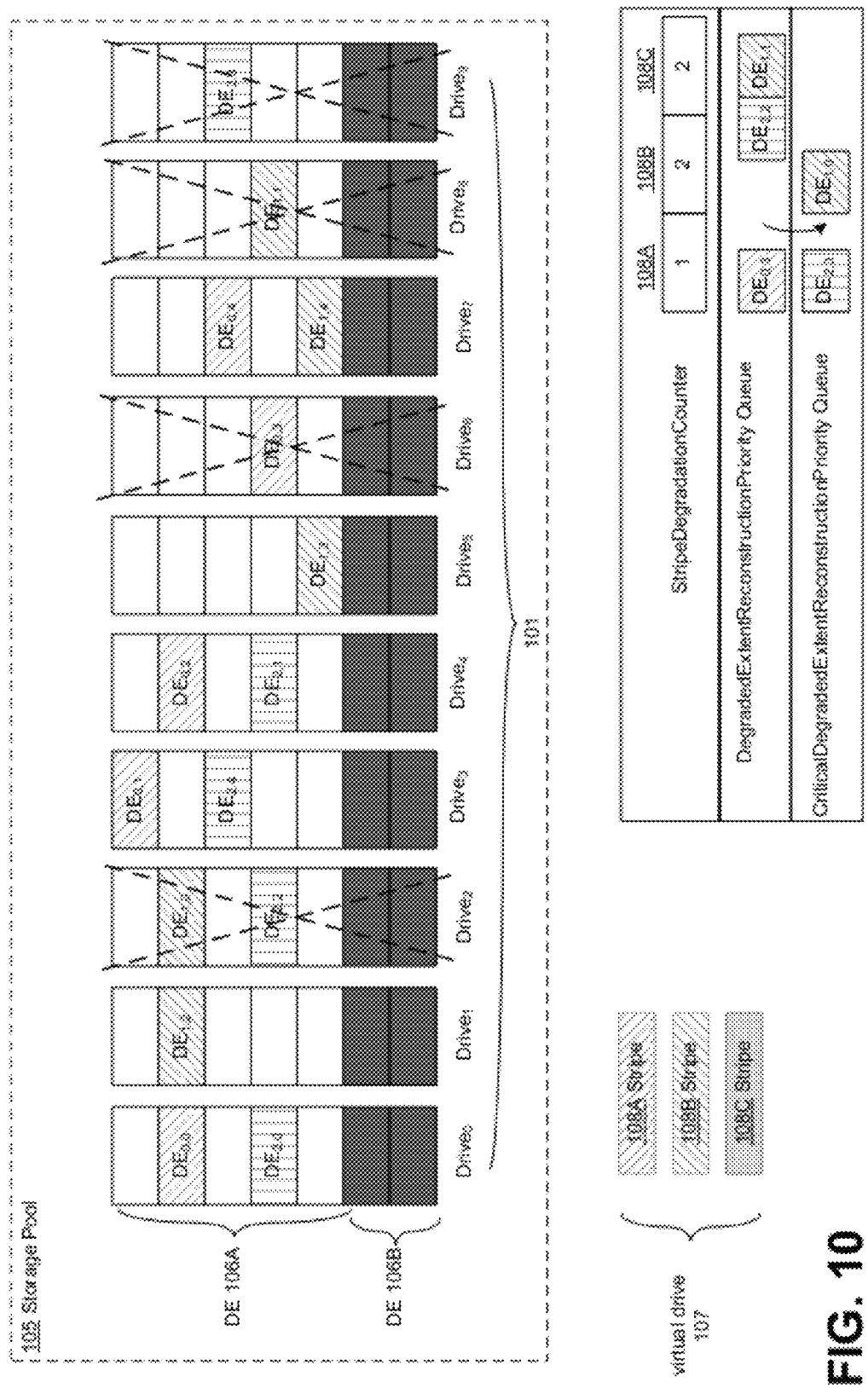
FIG. 10 illustrates a system for degraded drive reconstruction.

Still further, as shown in FIG. 10, it may be the case that $Drive_8$ including $DE_{1,1}$ suffers a drive failure. As the stripe 108B already has an existing failed drive extent 106A (e.g. as described above with respect to $DE_{1,0}$ of $Drive_2$), the I/O controller 103 may transition a stripe 108B to a critically degraded state. For example, the DegradedDriveCounter for stripe 108B may be incremented to "2". As stripe 108B has an existing drive extent 106A (e.g. $DE_{1,0}$), the existing degraded drive extent 106A (e.g. $DE_{1,0}$) may be moved to the CriticalDegradedExtentReconstructionPriority Queue and the newly degraded drive extent 106A (e.g. $DE_{1,1}$) may be added to the DegradedExtentReconstructionPriority Queue.

Figure 11:
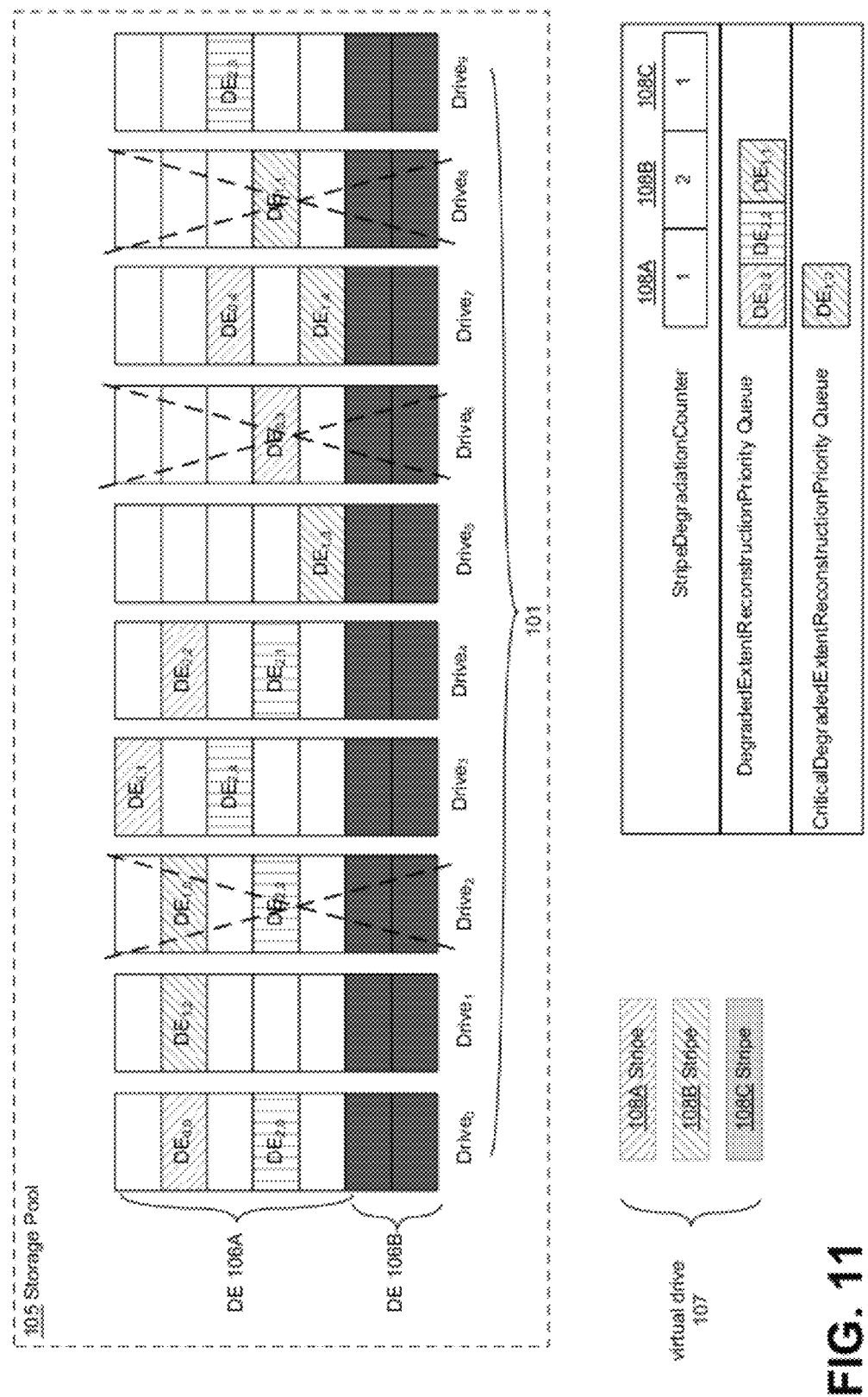
FIG. 11 illustrates a system for degraded drive reconstruction.
Figure 12:
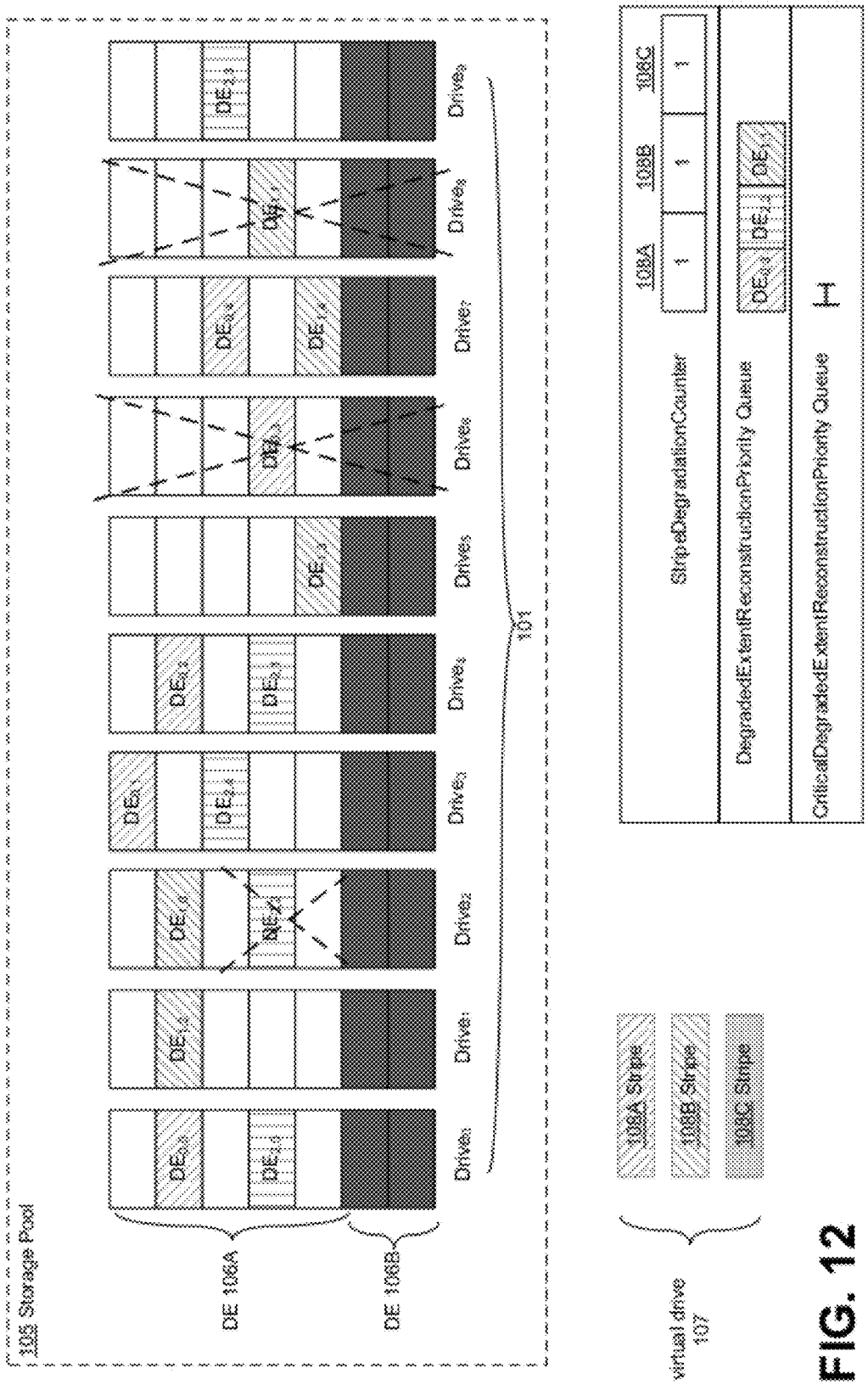
FIG. 12 illustrates a system for degraded drive reconstruction.
Figure 13:
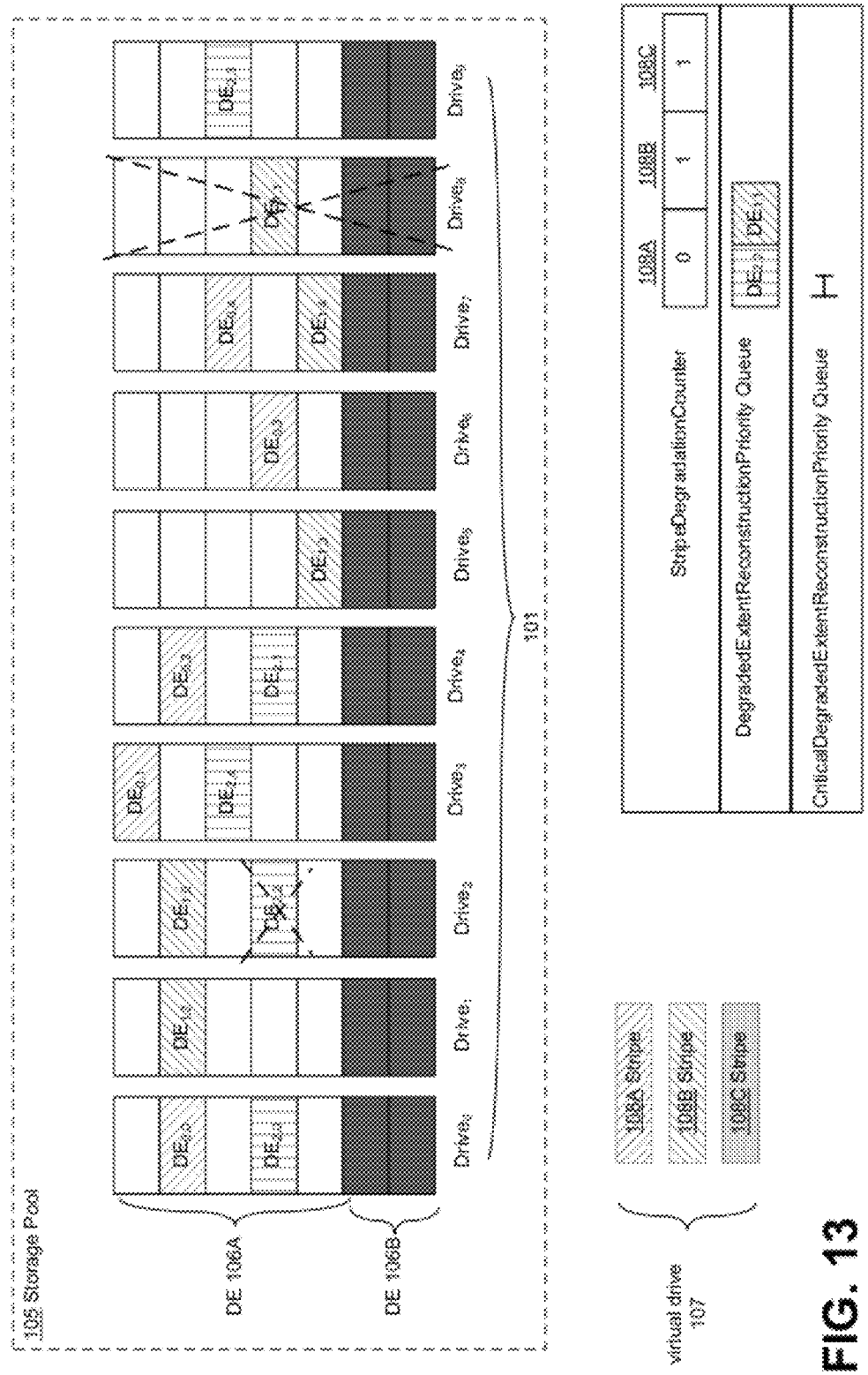
FIG. 13 illustrates a system for degraded drive reconstruction.
Figure 14:
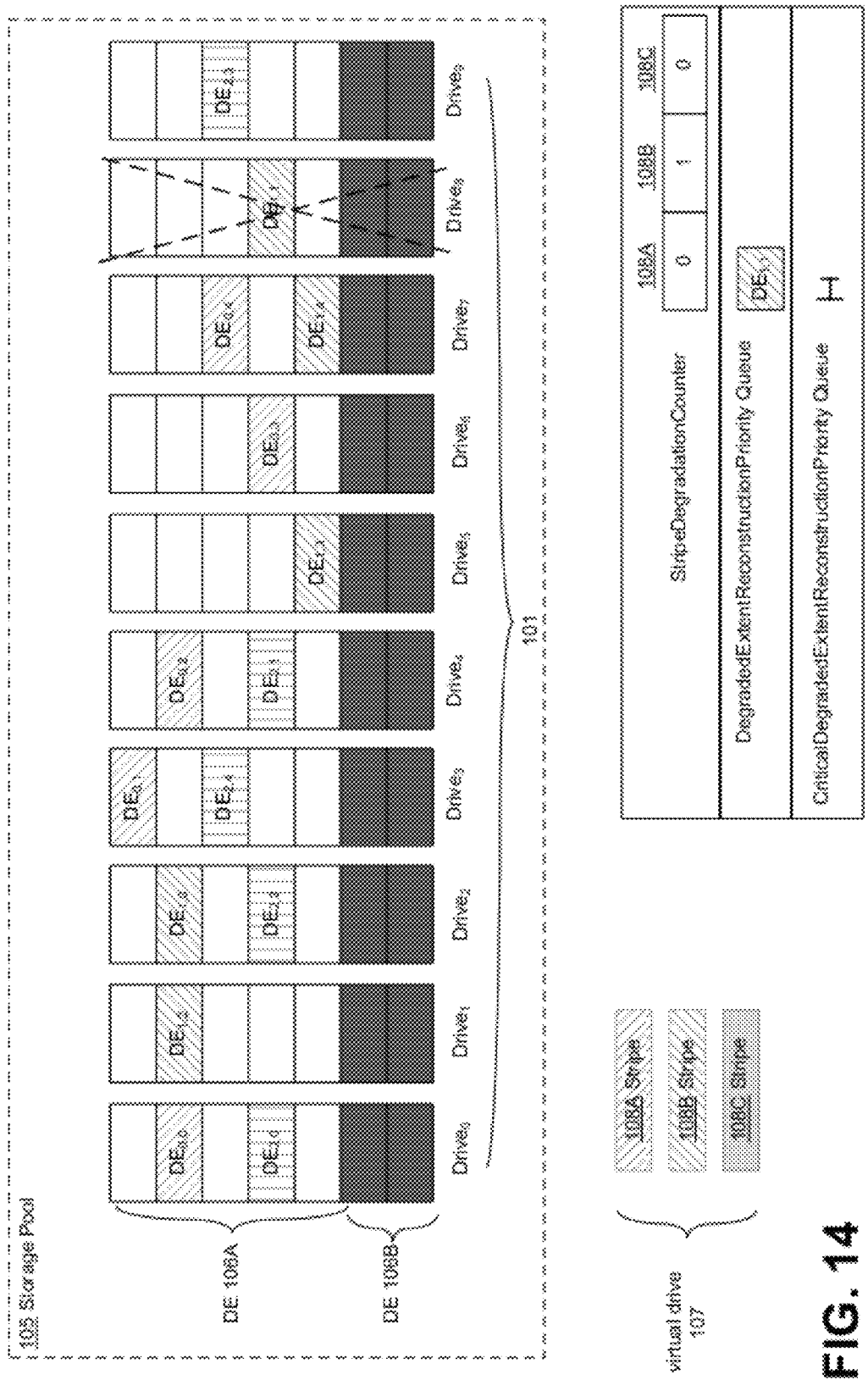
FIG. 14 illustrates a system for degraded drive reconstruction.
Figure 15:
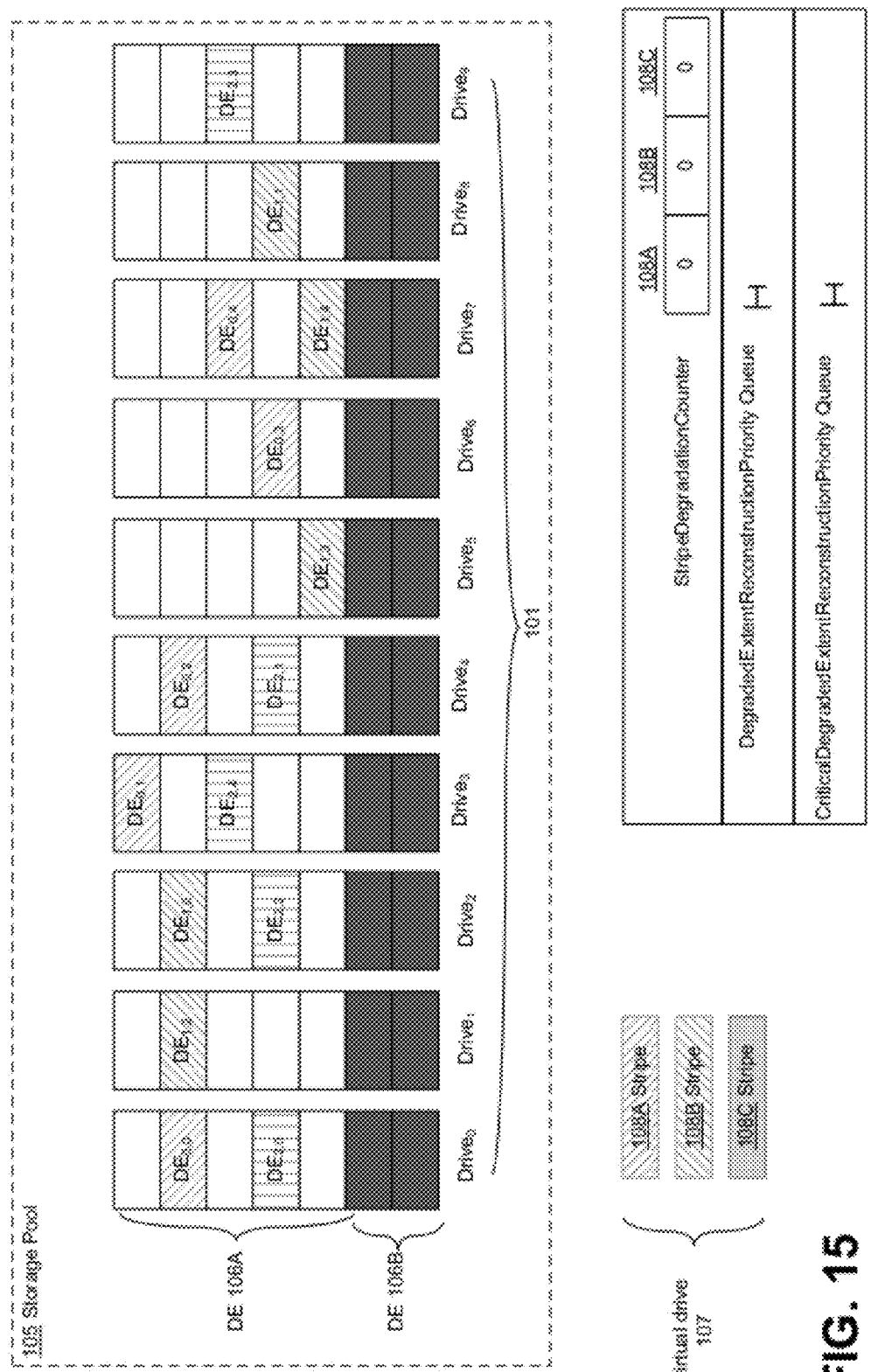
FIG. 15 illustrates a system for degraded drive reconstruction.

Operation 606 depicts reconstructing at least one of the drive extent associated with the first data stripe, the drive extent associated with second data stripe and the second drive extent associated with the second data stripe according to the reconstruction priority of the drive extent associated with the first data stripe, the drive extent associated with second data stripe and the second drive extent associated with the second data stripe. For example, as shown in FIGS. 10 and 11, prioritized reconstruction may be performed. Prioritized reconstruction orders the reconstruction of drive extents 106A so that drive extents 106A associated with critically degraded stripes 108 (e.g. those stripes having no available redundancy) may be reconstructed prior to drive extents 106A associated with stripes 108 that still have a single degraded drive. Once all drive extents 106A associated with critically degraded stripes 108 have been reconstructed and the virtual drive 107 can sustain an additional drive failure (e.g. every remaining stripe 108 has at least one redundant drive), reconstruction of drive extents 106A associated with stripes 108 having a single degraded drive may continue.

As shown in FIG. 10, stripe 108B and stripe 108C have become critically degraded. Prioritization or reconstruction between drive extents 106A associated with critically degraded stripes 108 may be on a temporal or other basis (e.g. as described above). As such, at least one drive extent 106A (e.g. $DE_{2,3}$ and $DE_{1,0}$) may be reconstructed first. For example, as drive extent 106A e.g. $DE_{2,3}$ is in the first position in the CriticalDegradedExtentReconstructionPriority queue. As such, drive extent 106A $DE_{2,3}$ may be reconstructed to the reconstruction drive extents 106B and copied to a replacement drive prior to the reconstruction of drive extent 106A $DE_{1,0}$. As shown in FIG. 11, following reconstruction of drive extent 106A $DE_{2,3}$, drive extent 106A $DE_{2,3}$ may be removed from the CriticalDegradedExtentReconstructionPriority queue and reconstruction of $DE_{1,0}$ may commence.

Reconstruction of drive extents 106A associated with degraded stripes 108 may proceed in like manner until all drive extents 106A associated with critically degraded stripes 108 are removed from the CriticalDegradedExtentReconstructionPriority queue. After all drive extents 106 associated with critically degraded stripes 108 are rebuilt, drive extents 106 associated with normally degraded stripes 108 may be rebuilt, in like manner.

For example, as shown in FIGS. 12-15, drive extents 106A $DE_{1,0}$, $DE_{0,3}$, $DE_{2,2}$ and $DE_{1,1}$ may be reconstructed according to their respective priorities within the CriticalDegradedExtentReconstructionPriority queue and the CriticalDegradedExtentReconstructionPriority queue.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs.

efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies.

What is claimed is:

1. A method for prioritizing drive reconstruction comprising:
   storing data across two or more drives in one or more data stripes, each data stripe including two or more drive extents;
   detecting a degradation of a drive containing a drive extent associated with a first data stripe;
   assigning a reconstruction priority to the drive extent associated with the first data stripe;
   detecting a degradation of a drive containing a first drive extent associated with a second data stripe;

assigning a reconstruction priority to the first drive extent associated with the second data stripe that is lower than the reconstruction priority of the drive extent associated with the first data stripe;

detecting a degradation of a drive containing a second drive extent associated with the second data stripe; and transitioning the reconstruction priority of a drive extent associated with the second data stripe to a reconstruction priority higher than the reconstruction priority of the drive extent associated with the first data stripe in response to the detection of a degradation of a drive containing the second drive extent.

2. The method of claim 1, further comprising:

reconstructing at least one of the first drive and the second drive according to at least the reconstruction priority of the first data stripe and the reconstruction priority of the second data stripe.

3. The method of claim 1, further comprising:

reconstructing at least one of the drive extent associated with the first data stripe, the drive extent associated with second data stripe and the second drive extent associated with the second data stripe according to the reconstruction priority of the drive extent associated with the first data stripe, the drive extent associated with second data stripe and the second drive extent associated with the second data stripe.

4. The method of claim 1, wherein the storing data across two or more drives in one or more data stripes, each data stripe including two or more drive extents comprises:

storing data across two or more drives in one or more data stripes according to a Controlled Replication Under Scalable Hashing (CRUSH) algorithm, each stripe including two or more drive extents.

5. The method of claim 1, wherein the detecting a degradation of a drive containing a drive extent associated with a first data stripe comprises:

incrementing a counter associated with the first data stripe.

6. The method of claim 1, wherein the transitioning a reconstruction priority of a drive extent associated with the second data stripe to a reconstruction priority higher than a reconstruction priority of the drive extent associated with the first data stripe includes:

queuing the drive extent of the second data stripe at a position in a reconstruction priority queue having a higher priority than a position of the drive extent of the first data stripe in the reconstruction priority queue.

7. A system for prioritizing drive reconstruction comprising:

a data storage device configured for storing data; and
a computing device configured for:

storing data across two or more drives in one or more data stripes, each data stripe including two or more drive extents;

detecting a degradation of a drive containing a drive extent associated with a first data stripe;

assigning a reconstruction priority to the drive extent associated with the first data stripe;

detecting a degradation of a drive containing a first drive extent associated with a second data stripe; and assigning a reconstruction priority to the first drive extent associated with the second data stripe that is lower than the reconstruction priority of the drive extent associated with the first data stripe; and detecting a degradation of a drive containing a second drive extent associated with the second data stripe; and transitioning the reconstruction priority of a drive extent associated with the second data stripe to a reconstruction priority higher than the reconstruction priority of the drive extent associated with the first data stripe in response to the detection of a degradation of a drive containing the second drive extent.

8. The system of claim 7, wherein the computing device is further configured for:

reconstructing at least one of the first drive and the second drive according to at least the reconstruction priority of the first data stripe and the reconstruction priority of the second data stripe.

9. The system of claim 7, wherein the computing device is further configured for:

reconstructing at least one of the drive extent associated with the first data stripe, the drive extent associated with second data stripe and the second drive extent associated with the second data stripe according to the reconstruction priority of the drive extent associated with the first data stripe, the drive extent associated with second data stripe and the second drive extent associated with the second data stripe.

10. The system of claim 7, wherein the computing device configured for storing data across two or more drives in one or more data stripes, each data stripe including two or more drive extents is further configured for:

storing data across two or more drives in one or more data stripes according to a Controlled Replication Under Scalable Hashing (CRUSH) algorithm, each stripe including two or more drive extents.

11. The system of claim 7, wherein the computing device configured for detecting a degradation of a drive containing a drive extent associated with a first data stripe is further configured for:

incrementing a counter associated with the first data stripe.

12. The system of claim 7, wherein the computing device configured for transitioning a reconstruction priority of a drive extent associated with the second data stripe to a reconstruction priority higher than a reconstruction priority of the drive extent associated with the first data stripe is further configured for:

queuing the drive extent of the second data stripe at a position in a reconstruction priority queue having a higher priority than a position of the drive extent of the first data stripe in the reconstruction priority queue.

13. A system for prioritizing drive reconstruction comprising:

circuitry for storing data across two or more drives in one or more data stripes, each data stripe including two or more drive extents;

circuitry for detecting a degradation of a drive containing a drive extent associated with a first data stripe;

circuitry for assigning a reconstruction priority to the drive extent associated with the first data stripe;

circuitry for detecting a degradation of a drive containing a first drive extent associated with a second data stripe; and circuitry for assigning a reconstruction priority to the first drive extent associated with the second data stripe that is lower than the reconstruction priority of the drive extent associated with the first data stripe; and means for detecting a degradation of a drive containing a second drive extent associated with the second data stripe;

means for transitioning the reconstruction priority of a drive extent associated with the second data stripe to a reconstruction priority higher than the reconstruction priority of the drive extent associated with the first data stripe in response to the detection of a degradation of a drive containing the second drive extent.

14. The system of claim 13, further comprising:
circuitry for reconstructing at least one of the first drive and the second drive according to at least the reconstruction priority of the first data stripe and the reconstruction priority of the second data stripe.

15. The system of claim 13, further comprising:
circuitry for reconstructing at least one of the drive extent associated with the first data stripe, the drive extent associated with second data stripe and the second drive extent associated with the second data stripe according to the reconstruction priority of the drive extent associated with the first data stripe, the drive extent associated with second data stripe and the second drive extent associated with the second data stripe.

16. The system of claim 13, wherein the circuitry for storing data across two or more drives in one or more data stripes, each data stripe including two or more drive extents comprises:

circuitry for storing data across two or more drives in one or more data stripes according to a Controlled Replication Under Scalable Hashing (CRUSH) algorithm, each stripe including two or more drive extents.

17. The system of claim 13, wherein the circuitry for detecting a degradation of a drive containing a drive extent associated with a first data stripe comprises:
circuitry for incrementing a counter associated with the first data stripe.

18. The system of claim 13, wherein the circuitry for assigning a reconstruction priority to a drive extent associated with the second data stripe that is higher than a reconstruction priority of the drive extent associated with the first data stripe comprises:
circuitry for queuing the drive extent of the second data stripe at a position in a reconstruction priority queue having a higher priority than a position of the drive extent of the first data stripe in the reconstruction priority queue.

* * * * *